United States Patent
Spencer

[15] 3,696,674
[45] Oct. 10, 1972

[54] ELECTROMAGENTIC FLOWMETER APPARATUS
[72] Inventor: Merrill P. Spencer, 5151 Kenilworth Place, N.E., Seattle, Wash. 98105
[22] Filed: June 19, 1968
[21] Appl. No.: 738,306

[52] U.S. Cl............................73/194 EM, 128/2.05 F
[51] Int. Cl................................................G01p 5/08
[58] Field of Search............73/194 EM; 128/2.05 F

[56] References Cited

UNITED STATES PATENTS

| | | |
|---|---|---|
| 2,696,737 | 12/1954 | Mittelmann..........73/194 EM |
| 3,184,966 | 5/1965 | Thornton et al......73/194 EM |
| 3,372,589 | 3/1968 | Mannherz.............73/194 EM |
| 3,487,826 | 1/1970 | Barefoot................128/205 F |
| 3,516,399 | 6/1970 | Barefoot................128/205 F |
| 3,529,591 | 9/1970 | Schuette...........73/194 EM X |

Primary Examiner—Charles A. Ruehl
Attorney—Seed, Berry & Dowrey

[57] ABSTRACT

Electromagnetic flowmeters wherein voltages induced in a conductive fluid flowing through magnetic fields having boundaries defined by magnetic cores impress voltages on the cores which are in turn coupled to output circuitry by electrodes connected to the cores.

19 Claims, 8 Drawing Figures

PATENTED OCT 10 1972
3,696,674
SHEET 1 OF 2
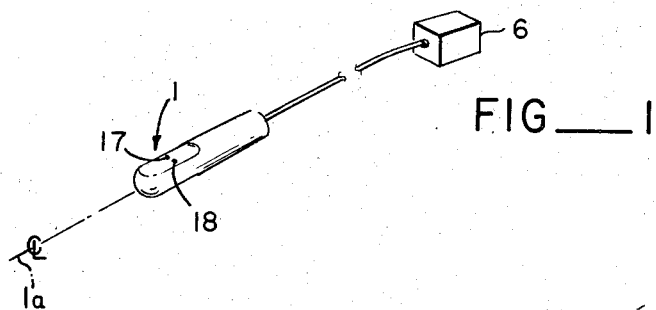
FIG__1
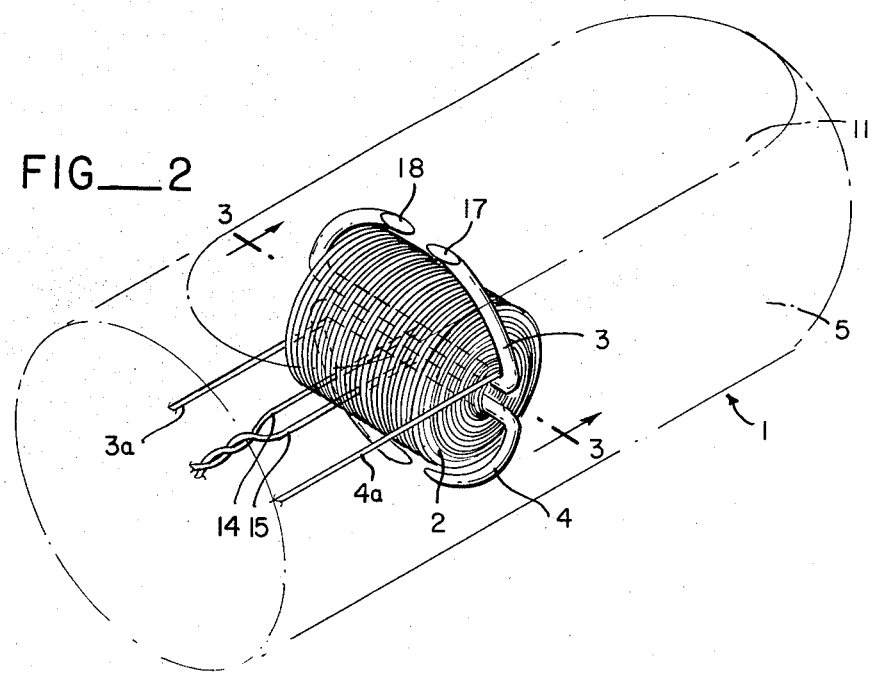
FIG__2
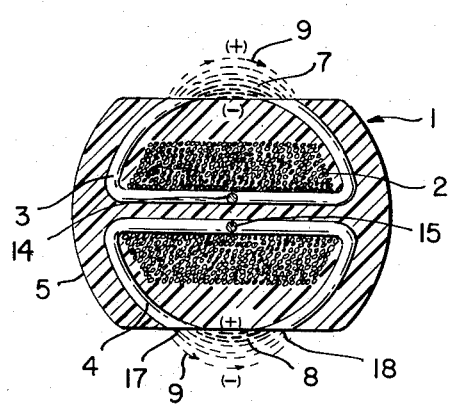
FIG__3
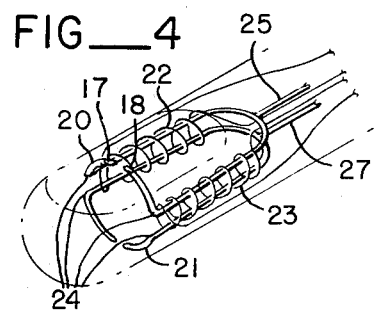
FIG__4
MERRILL P. SPENCER
INVENTOR.
BY Seed, Berry & Dowrey
ATTORNEYS

3,696,674
PATENTED OCT 10 1972
SHEET 2 OF 2
FIG__5
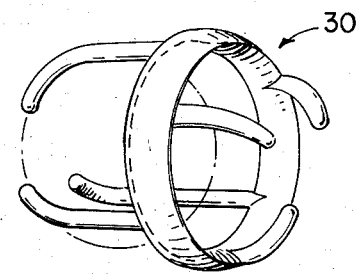
FIG__6
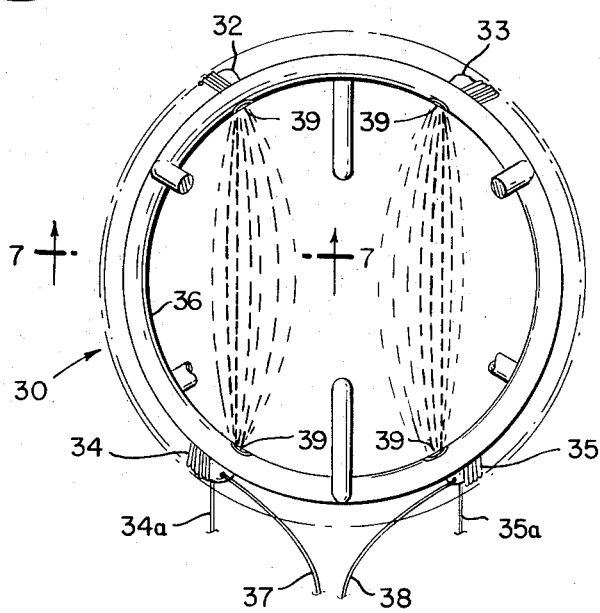
FIG__8
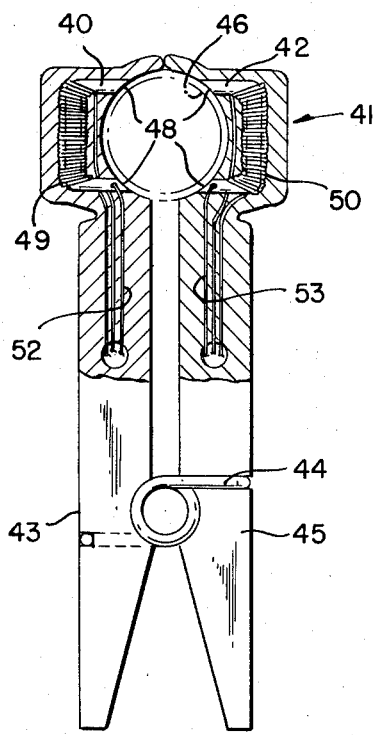
FIG__7
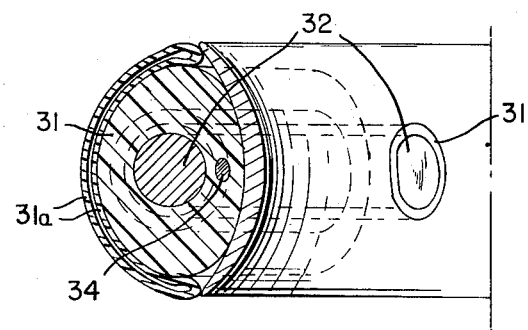
MERRILL P. SPENCER
INVENTOR.
BY *Sogd, Berry & Downey*
ATTORNEYS

| 3,696,674

ELECTROMAGENTIC FLOWMETER APPARATUS

BACKGROUND OF THE INVENTION

The present invention relates generally to fluid flowmeters and specifically it relates to the magnetic core and electrode structure of electromagnetic flowmeters.

Electric flowmeters are in principal similar to dynamo generators. In a generator, a conductor (a winding of a coil) traverses a uniform magnetic field so as to cut magnetic lines of force at right angles. An e.m.f. or voltage is induced in the conductor which is picked up through brushes connected to the ends of the conductor. In a flowmeter, the generator rotor is replaced by a conduit carrying a conductive fluid. The fluid flows so as to cut magnetic lines of force at right angles thereby inducing an e.m.f. in the fluid. The induced voltage is picked up through the walls of the conduit which serve a function similar to that of brushes in the generator. The induced voltage is proportional to the velocity of fluid and provides an instantaneous report on the velocity of the fluid which can be displayed or recorded at a monitoring station.

Lines of equal voltage potential induced in the fluid correspond to the directional lines, i.e., flux lines, of the magnetic field. Therefore, placing electrodes across the field on a line orthognal to the flux lines is a method for reading out voltages induced in the fluid. However, if the field varies in time, such as that produced between the poles of an alternating current (AC) magnetic coil, a transformer effect induces voltages on the electrodes in addition to those sought to be measured. The location of the electrodes tends to maximize the transformer effect because they are positioned directly in the magnetic field. Direct current (DC) magnetic coils are not common in electromagnetic flowmeters because of electrolytic effects occuring at the electrodes.

The present invention eliminates the requirement for inserting read out electrodes or leads into the magnetic field. The leads are instead connected directly to the core of a magnetic coil so that the core also serves as electrodes. Surfaces of the core are placed in contact with the flowing fluid. A voltage related to the flow induced voltage and therefore to fluid velocity is impressed on the core. The core voltage is communicated to output circuitry by a lead coupled to the core at a position outside the field through which the fluid flows. This reduces the transformer effect. Greater accuracy is possible if two paired cores are used to establish symmetrical magnetic fields. Voltages on the cores have substantially the same magnitude, assuming equal fluid flow through each field, and by proper handling of polarities the voltages can be summed. The sum of the two voltages may offer a more reliable indication of the fluid velocity.

The present invention is especially advantageous in medicine where the simplified structure allows for miniaturization and the reduced transformer effect improves the detection of small flow induced voltages. Miniaturization is important in catheter flow meters which are instruments designed to be inserted into the lumen of a blood vessel. A flowmeter incorporated in a heart valve also required miniaturization. Both of these flowmeters seek to detect voltages in the microvolt range.

Another advantage of the present invention is that surfaces of the core are at the locations of greatest flux density and therefore at locations where the flow induced voltages are at a maximum.

It is accordingly the object of the present invention to devise an improved electromagnetic flowmeter and further to simplify the structure of a flowmeter by detecting impressed core voltages using electrodes attached to the cores and in particular it is an object of the present invention to devise improved structures for catheter and heart valve flowmeters.

DESCRIPTION OF THE DRAWINGS

Other objects and features of the present invention will be apparent from a reading of the present specification and from the drawings which are:

FIG. 1 is a perspective view of an electromagnetic catheter flowmeter and associated energizing and read out circuitry represented in block form;

FIG. 2 is an enlarged perspective view of the catheter flowmeter in FIG. 1 reversed 180° illustrating the internally located magnetic coil, cores and electrodes of the flowmeter;

FIG. 3 is a cross-section elevation view of the flowmeter of FIG. 2 including an illustration of the direction of the magnetic fields and the relative polarity of voltages induced in a fluid flowing into the page;

FIG. 4 is a perspective view of another embodiment of an electromagnetic catheter flowmeter employing two magnetic coils orientated with their axes parallel to that of the primary axis of the catheter;

FIG. 5 is a perspective view of a heart valve having an electromagnetic flowmeter according to the present invention incorporated therein;

FIG. 6 is an end view of the heart valve shown in FIG. 5 as seen when viewed from the right side;

FIG. 7 is a cross-section view of the heart valve in FIG. 6 as viewed along lines 7—7 therein; and FIG. 8 is a top view of another embodiment of a flowmeter structure similar to that of the heart valve incorporated in a clothes pin type structure suited for clamping onto a fluid conduit.

A flowmeter generally connotates an instrument for measuring a unit volume of fluid flow per unit time. In the present specification flowmeter is intended to include velometry, i.e., the measurement of local velocities in a fluid stream. Of course, given the velocity profile of a fluid stream and the dimensions of its conduit, volume flow per unit of time of the fluid can be determined. Empirical calculations of average velocity and of volume flow per unit can be made from local velocity information.

FIG. 3 shows the general direction of flux lines in the fields about catheter 1 and the relative polarity of voltages induced in a fluid assumed to be flowing into the page along the primary axis of the catheter. The direction of the voltage is orthogonal to the flux lines. The catheter comprises magnetic coil 2 wound about the separate cores 3 and 4 and mounted in and electrically insulated from one another by electrical insulating material 5. Output circuitry 6 shown in FIG. 1 is coupled to the cores by twisted electrode leads 14 and 15. Two symmetrical magnetic fields of generally the same size and shape are established in the gaps 7 and 8 between the end surfaces of cores 3 and 4. The direction of the magnetic field flux lines is given generally by arrows 9. The direction of the arrows changes by 180 degrees on a time basis according to the change in the alternating current (AC) circuit driving magnetic coil 2. Direct current (DC) circuits may be used as well as a permanent magnet but the AC magnet means is presently preferred.

Catheter 1 is designed for insertion along its primary axis 1a into the lumen of a blood vessel, i.e., directly into the passage of a conduit. Blood, a conductive fluid, flows through the fields in gaps 7 and 8. The flux density of the field through which the fluid flows is the greatest near the core surfaces in contact with the fluid. Voltages are induced in the fluid in areas occupied by the fields. The core end surfaces generally defining boundaries of the field through which a fluid flows are orientated relative to the field such that the flux lines are not everywhere normal to these surfaces. Therefore, the flow induced voltages adjacent the end surfaces of the cores are impressed on the cores. The voltages on the cores result from the flow of blood relative to the catheter through the fields and are related to the velocity of the blood at the points where the cores contact the blood. The core voltages are transmitted to the output circuitry by the electrode leads 14 and 15, physically connected to the cores. Two cores are used because of the small magnitude of the voltages sought to be measured. The sum of the two flow induced voltages is easier to detect and if averaged may provide a more accurate indication of fluid velocity. The polarity of the core signals can be reversed relative to each other to assist in a summing or averaging process by either electrical techniques in the output circuitry or by reversing the direction of the flux lines in the fields relative to each other. The detected voltages, without attempting to assign quantitative values to their magnitudes, may be used to observe direction of fluid flow and its rate of change. Calibration of the voltages permits information to be obtained in regard to specific velocity values and from this information volume flow per unit time can be determined.

The output circuitry 6 supplies the electrical energy to coil leads 3a and 4a for driving the magnetic coil and provides the display means for reading out the voltages between electrode leads 14 and 15 electrically connected to the cores. The preferred embodiment of circuitry 6 includes a square wave electromagnetic flowmeter circuit described in an article in *The Review of Scientific Instruments*, Vo. 27, No. 9, pages 707–711, September, 1965, by A. B. Denison, Jr. and M. P. Spencer, the present inventor.

The square wave circuitry employs, after its name, a square wave excitation signal to drive magnetic coil 2. Use of the square wave signal offers the flowmeter many of the advantages of both AC and DC circuits. The square wave generator establishes the alternating field required to avoid electrolysis while at the same time providing a temporary steady-state signal. A blanking circuit separates the transformer portion of the output signal from the measured voltage.

A flowmeter having the structure generally of that shown in FIGS. 2 and 3 has been made using No. 38 iron wire as cores 3 and 4. The windings of the magnetic coil 2 are made from No. 44 copper wire. The coils and cores are embedded in a clear plastic insulating material 5 to electrically isolate the windings of the coils from each other and from the cores. The cores are insulated from each other and from the coils. The insulating material also forms the case of the catheter. Surfaces 17 and 18 on both cores 3 and 4 extend through the plastic insulating material 5 and are flush with the plane surface 11 on the generally circular cross-section of the catheter. They contact fluid flowing past the catheter. The surfaces 17 and 18 may be coated with a non-corrosive or electrolytically inert conductive material. The core may comprise of stainless steel rather than iron or any other material of satisfactory permitivity chemically compatible with the fluid with which it is to be used.

The flowmeter in FIG. 4 is another embodiment of a catheter instrument. It has two magnetic coils. Cores 20 and 21 are shaped to form right angles at points 24. They also have surfaces 17 and 18 for contacting a fluid. This permits the magnetic coils 22 and 23, or a single coil, to be wound around the cores as shown with their axes extending along the primary axis of the catheter. A single coil can be used in place of the two coils if its windings surround both cores. This embodiment permits the two coils or a single to have a greater number of windings and therefore to generate a larger amount of flux. Also, the arrangement of the cores enables the electrode leads 25 and 27 to be physically connected to the cores at the places shown which is even further removed from the magnetic field thereby reducing the transformer effect. Other arrangements of the cores can be devised to permit the electrode leads to be connected to the cores in a similar manner and to permit a coil to be wound with its axis parallel to the primary axis of the catheter. An example would be to shape the cores generally as those in FIGS. 2 and 3, rotate the cores and coil 90 degrees relative to the catheter and laterally offset the exposed tips 17 and 18 to orientate the flux lines perpendicular to the primary axis of the catheter. The electrode leads 25 and 27 are terminated in an output circuit of the square wave type as described earlier. Likewise the terminals of the magnetic coils 22 and 23 are coupled to a square wave generator in the output circuitry.

Heart valve 30, shown in FIG. 5, has incorporated about its periphery a flowmeter employing magnetic cores and electrodes according to the present invention. As best seen in FIG. 7, the cores 32 and 33 are insulated from the heart valve ring 36 through which blood flows by a suitable electrical insulating material 31. The insulating material also covers magnetic coils 34 and 35 wound around the two cores. The end surfaces of cores 32 and 33 extend through the inner periphery of the ring 36 at four points 39. Points 29 are surfaces of the cores which contact blood flowing through the valve and are flush with the inner walls of ring 36. FIG. 6 illustrates the magnetic fields through which blood flows. The fluid flowing through the magnetic fields has voltages induced in it. The induced voltages near the core surfaces at points 39 are impressed on the cores. The voltages on the two cores are sensed or detected by electrode leads 37 and 38, physically connected to cores 32 and 33. These leads are terminated in appropriate output circuitry as described earlier. Coil leads 34a and 35a are preferably coupled to an appropriate square wave generator as described earlier. Apron 31a is a device for enabling the heart valve to be sewed or otherwise secured to a human or animal heart.

The clothes pin type structure shown in FIG. 8 is a flowmeter according to the present invention. This device is designed primarily for clamping onto the walls of a blood vessel. The walls of the conduit must be at least partially conductive to enable the cores to electrically contact a fluid flowing therein. The structure of cores 40 and 42 and coils 49 and 50, and the operation of the device is similar to that of the heart valve.

The clothes pin type structure enables the flowmeter 41 at one end of the clothes pin to be expanded for clamping it onto a conduit. The flowmeter 41 is shown clamped onto conduit 46. Legs 43 and 45 are brought together at the end opposite the flowmeter 41 to expand the device. The spring 44 maintains or urges the ends containing flowmeter 41 together and the opposite ends apart.

Surfaces of the cores, at points 48, contact the walls of conduit 46. Voltages induced in the fluid are impressed on the cores at points 48 through the walls of the conduit. The advantage of this device is that it may be clamped onto a blood vessel or other electrically conductive conduit without significantly deforming the vessel in the process. The cores 40 and 42 and their respective windings 49 and 50 are arranged similar to those of the heart valve of FIG. 7. The magnetic fields through which the fluid flows is established between the core surface at points 48. The output electrode leads 52 and 53 are physically coupled to the cores 40 and 42 and are coupled to appropriate output circuitry where the voltages impressed on the cores are either recorded or displayed.

It is believed that the invention will have been clearly understood from the foregoing detailed description of my now-preferred illustrated embodiments. Changes in the details of construction may be resorted to without departing from the spirit of the invention. It is apparent that the catheter flowmeter may be adapted for measuring the velocity of fluids other than blood. Also, the embodiments incorporated in the heart valve and clothes pin type structures may be readily adapted to other configurations. Specifically, the core and electrode arrangement of the foregoing devices may be permanently installed about a cross-section of any fluid carrying conduit to provide permanent fluid flow monitoring. In addition, it should be understood that the various core and electrode structure of the present invention may be employed in apparatus for measuring the velocity of a vehicle through a stationary fluid. In this regard, the present invention pertains to relative velocities between a fluid and a core regardless which of the two moves relative to a common reference frame. Accordingly, it is my intention that no limitations be implied and that the hereto annexed claims be given the broadest interpretation to which the employed language fairly admits.

The embodiments of the invention in which an exclusive property or privilege is claimed are defined as follows:

1. An electromagnetic device for sensing voltages induced in a conductive fluid material moving relatively through a magnetic field comprising magnet means to produce the magnetic field, said magnet means having a ferromagnetic electrically conductive section through which extend flux lines of the magnetic field, said section having an electrically conductive exposed surface for electrical contact with the fluid material moving relatively through the magnetic field oriented with respect to the magnetic field so that flow induced voltages will be impressed on said surface, and sensing means electrically connected to the said section of said magnet means for detecting flow induced voltages impressed thereon when an electrical circuit is completed through the fluid material.

2. The device of claim 1 wherein said magnet means includes a permanent magnet.

3. The device of claim 1 including at least two of said magnet means for establishing at least two magnetic fields, each of said magnet means being electrically connected to said sensing means.

4. The device of claim 3 wherein said two magnetic fields are substantially symmetrical and substantially the same size and pattern and wherein the ferromagnetic electrically conductive section of each of said magnet means has a shape to form said fields in said manner.

5. The device of claim 1 wherein said magnet means comprises
at least one magnetic coil for producing magnetic flux when coupled to a source of electrical energy, the ferromagnetic electrically conductive section comprising
at least two magnetic cores positioned in the path of said flux for forming plural magnetic fields through which the fluid flows, said cores contacting the fluid flowing through said fields, and
means for coupling said coil to a source of electrical energy.

6. The device of claim 5 further including insulating material for electrically insulating said cores from each other and from said magnetic coil.

7. The device of claim 5 wherein said magnet means further includes an alternating current electrical energy source connected to said coupling means.

8. The device of claim 5 wherein said sensing means includes electrical leads electrically connected to said cores.

9. The device of claim 8 wherein said sensing means further include includes square-wave flowmeter circuitry.

10. The device of claim 1 wherein said ferromagnetic electrically conductive section comprises a magnetic core disposed for electrical contact with said fluid material at surfaces near the ends of said core, and wherein said magnet means comprises a magnetic coil wound about said core, and wherein said sensing means includes an electrical lead connected to said core.

11. The device of claim 10 in combination with a clothes pin type structure for clamping onto the walls of an electrically conductive conduit including two legs and a spring operatively coupled together, one end of said legs expanding when the legs are brought together at another end; wherein two of said magnet means are contained, one in each leg with a core, coil and electrical lead operatively mounted on each of said legs at the expandable end thereof, with surfaces of said cores positioned to contact the conduit when placed between the expandable ends.

12. The combination of claim 11 wherein said sensing means comprises output means coupled to said electrical leads to display voltages impressed on said cores in response to voltages induced in a fluid flowing through the conduit and further including an alternating current source of electrical energy coupled to said magnetic coils.

13. A catheter flowmeter for insertion along a primary axis of the flowmeter case into the lumen of a fluid conduit comprising;
    at least one magnetic coil for generating magnetic flux when said coil is coupled to a source of electrical energy,
    at least two magnetic electrically conductive cores inserted in the path of said flux directing said flux to form at least two magnetic fields perpendicular to said primary axis through which the fluid flows, each core having an exposed electrically conductive surface for electrical contact with fluid material flowing through the fluid conduit oriented with respect to its respective magnetic field so that flow induced voltages will be impressed on said surface, and
    an electrical lead connected to each of said magnetic cores.

14. The device of claim 13 further including means coupled to said electrical leads for monitoring voltages impressed on said cores in response to a voltage induced in a fluid flowing through said magnetic fields.

15. The flowmeter of claim 13 wherein said magnetic coil is oriented with its axis perpendicular to said primary axis, and
    said two magnetic cores have ends which define boundaries of said magnetic fields through which the fluid flows and are inserted within the windings of said coil, said ends each providing a said electrically conductive surface substantially flush with the surface of said flowmeter case contacting the flowing fluid,
    said cores positioned relative to each other to form said magnetic fields substantially 180° apart relative to the flowmeter case and in substantially the same plane.

16. The flowmeter of claim 15 further including an alternating current energy source coupled to said magnetic coil.

17. The flowmeter of claim 15 wherein said flowmeter case has a substantially circular cross-sectional shape except in the areas of said core ends where said case has substantially a plane shape.

18. The flowmeter of claim 17 wherein said case comprises an electrical insulating material for insulating said cores from each other and said magnetic coil.

19. The flowmeter of claim 13 wherein said magnetic coil is oriented with its axis parallel to the primary axis of the flowmeter, and where said two magnetic cores have ends defining boundaries of said magnetic fields through which a fluid flows and are positioned within the windings of said coil oriented relative to each other to locate said magnetic fields relative to the case of the flowmeter in substantially the same plane.

* * * * *